Nov. 6, 1951 F. C. LANGE 2,574,269
CUTTING MACHINE
Filed April 26, 1949 5 Sheets-Sheet 1

INVENTOR.
FRANK C. LANGE
BY
ATTORNEY

Nov. 6, 1951  F. C. LANGE  2,574,269
CUTTING MACHINE
Filed April 26, 1949  5 Sheets-Sheet 2

INVENTOR.
FRANK C. LANGE
BY
ATTORNEY

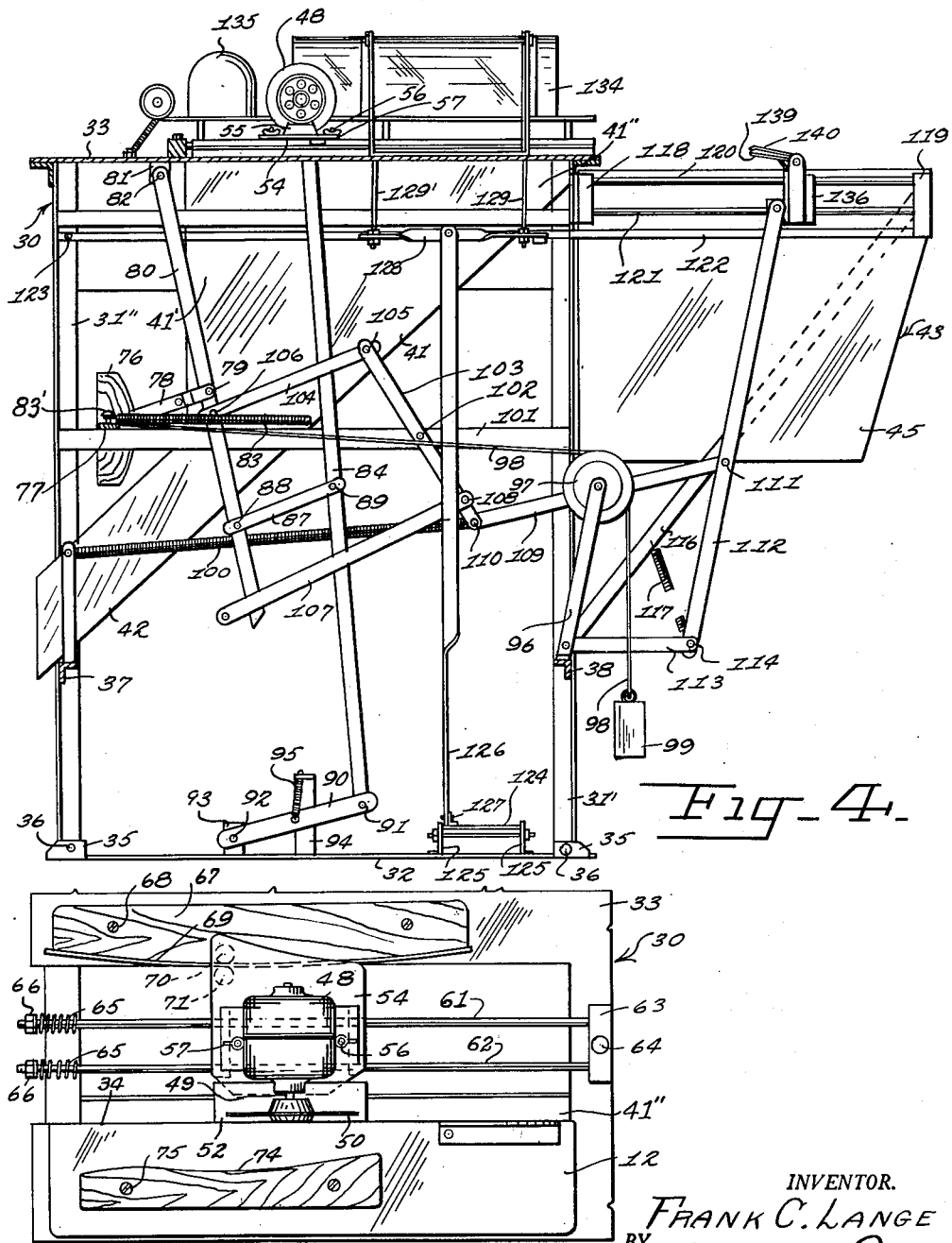

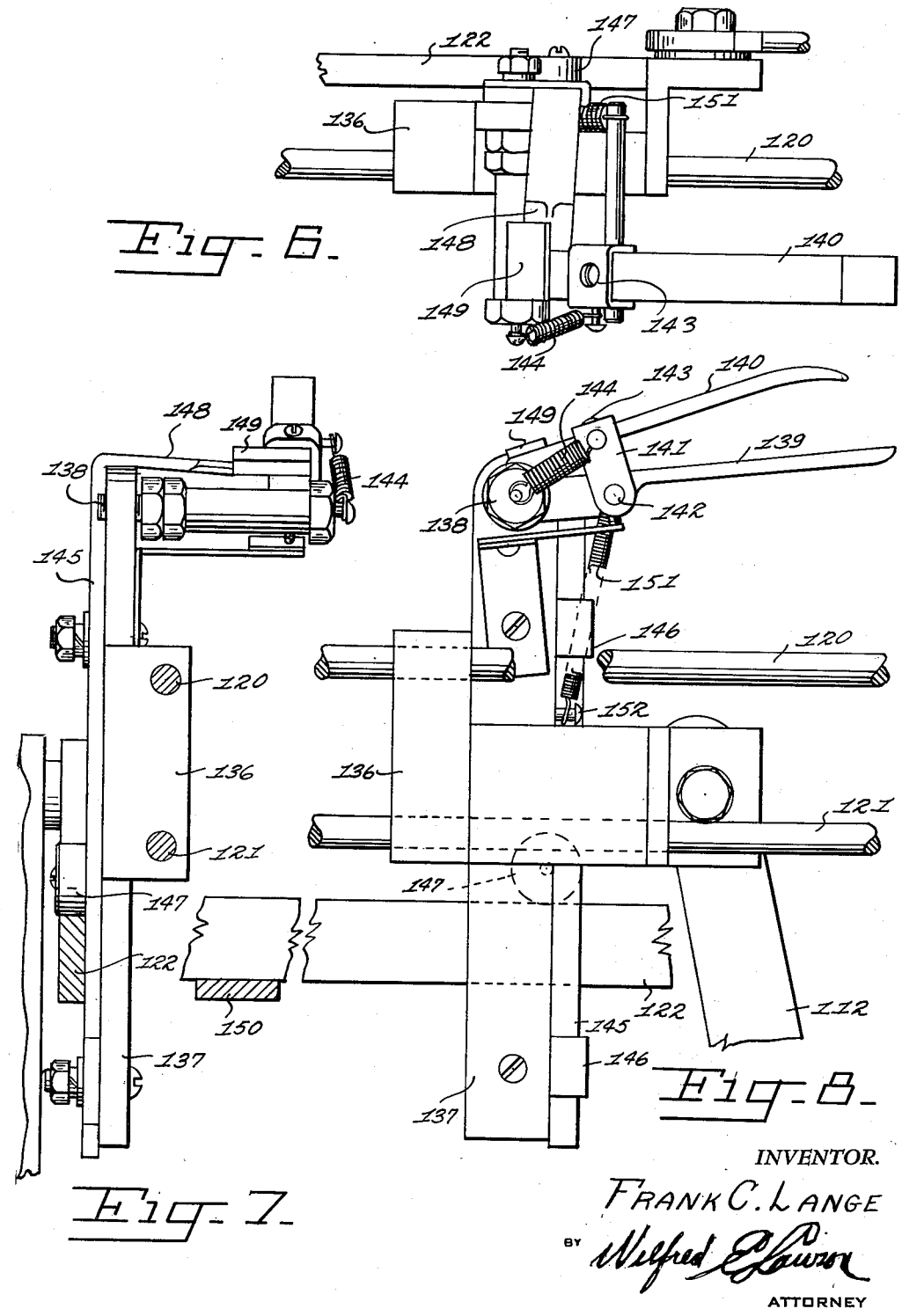

Nov. 6, 1951  F. C. LANGE  2,574,269
CUTTING MACHINE
Filed April 26, 1949  5 Sheets-Sheet 5
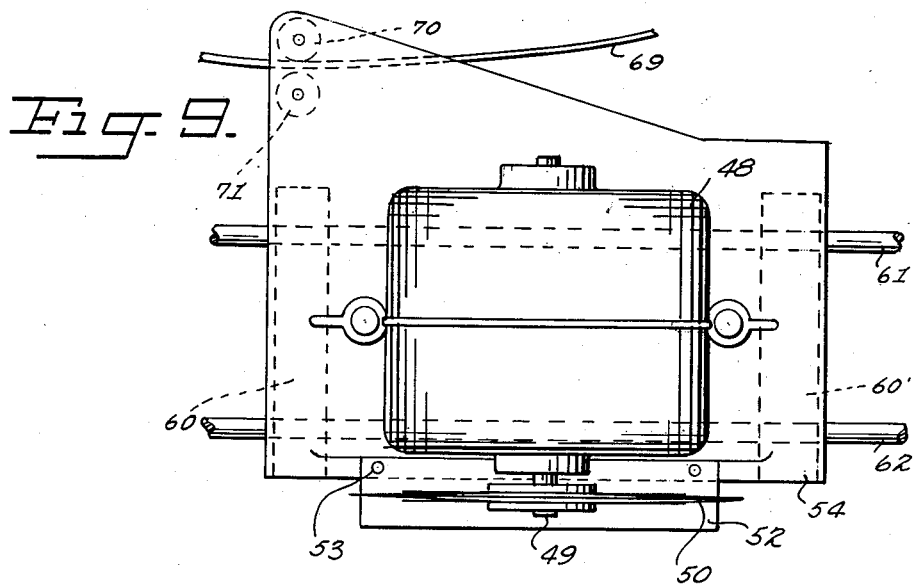
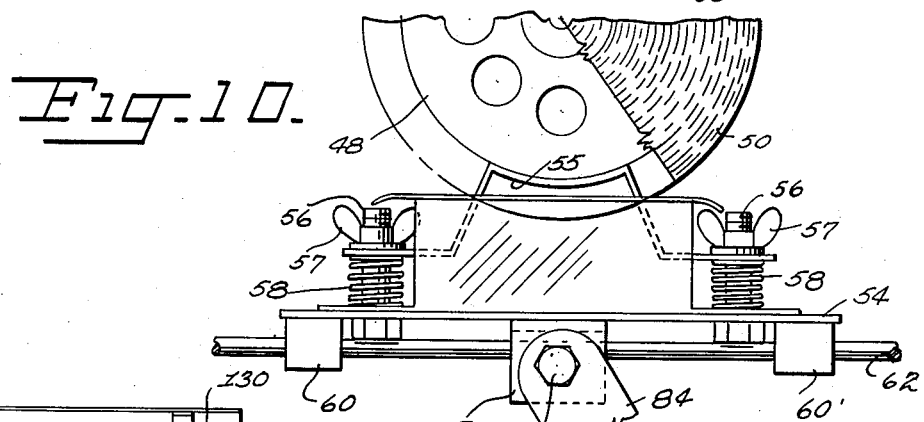
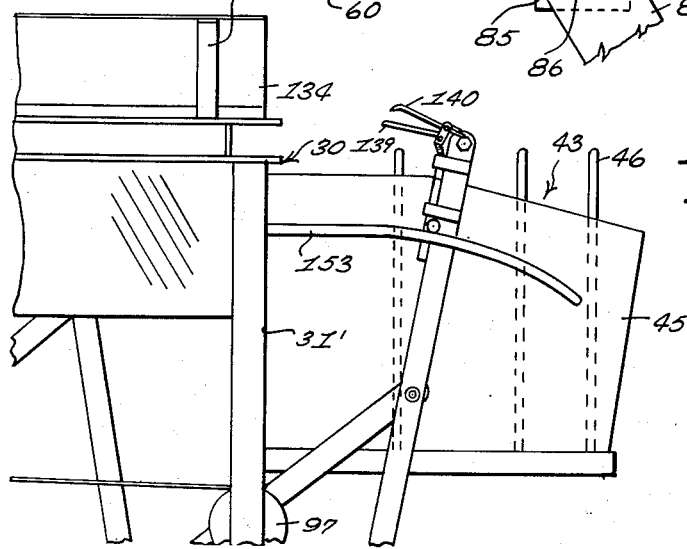
INVENTOR.
FRANK C. LANGE
BY *Wilfred E. Lawson*
ATTORNEY Patented Nov. 6, 1951

2,574,269

UNITED STATES PATENT OFFICE 2,574,269

CUTTING MACHINE

Frank C. Lange, Racine, Wis., assignor to The Badger Shirt Company, Racine, Wis., a corporation of Wisconsin Application April 26, 1949, Serial No. 89,727

11 Claims. (Cl. 164—76)

This invention relates to a cutting machine, and more particularly to a machine for cutting or trimming textiles, leather, or articles of wearing apparel.

The object of the invention is to provide a machine which has an electrically driven rotary cutting knife that moves forwardly under mechanical control to cut or trim collars, cuffs, and other articles evenly and precisely.

Another object of the invention is to provide a cutting machine having a motor driven cutting knife which is mounted for movement on a supporting table to selectively trim articles of apparel, and wherein a mechanism is provided for varying the position of the cutting knife so that it moves back and forth under the control of the operator.

Still another object of the invention is to provide a trimming or cutting machine which is easy to operate, and which is constructed so that a person can operate the machine with absolute safety, the various parts of the machine being arranged so that the device occupies a minimum of space.

A further object of the invention is to provide a machine for cutting or trimming articles such as collars or cuffs and which includes a motor driven rotary cutting knife that moves under the control of the operator to cut or trim the articles to a desired contour, and which includes a mechanism that picks up the articles after they have been cut and deposits the articles in a receptacle, the trimmed portion of the article being separated and moved to a convenient receptacle.

Other objects and advantages will become apparent during the course of the following description.

In the accompanying drawings, forming a part of this application, and in which like numerals are used to designate like parts throughout the same:

Figure 4 is an enlarged sectional view taken on the line 4—4 of Figure 2;

Figure 5 is an enlarged fragmentary top plan view of the machine, with the protecting shield removed;

Figure 6 is an enlarged fragmentary top plan view of the pick-up mechanism;

Figure 7 is a fragmentary end elevational view of the pick-up mechanism;

Figure 8 is a fragmentary front elevational view of the pick-up mechanism;

Figure 9 is an enlarged top plan view of the motor driven rotary cutting knife;

Figure 10 is a fragmentary front elevational view of the motor driven cutting knife, showing the mechanism for adjusting the depth of cutting; and Figure 11 is a fragmentary rear elevational view of a modified cutting machine.

Figure 1:
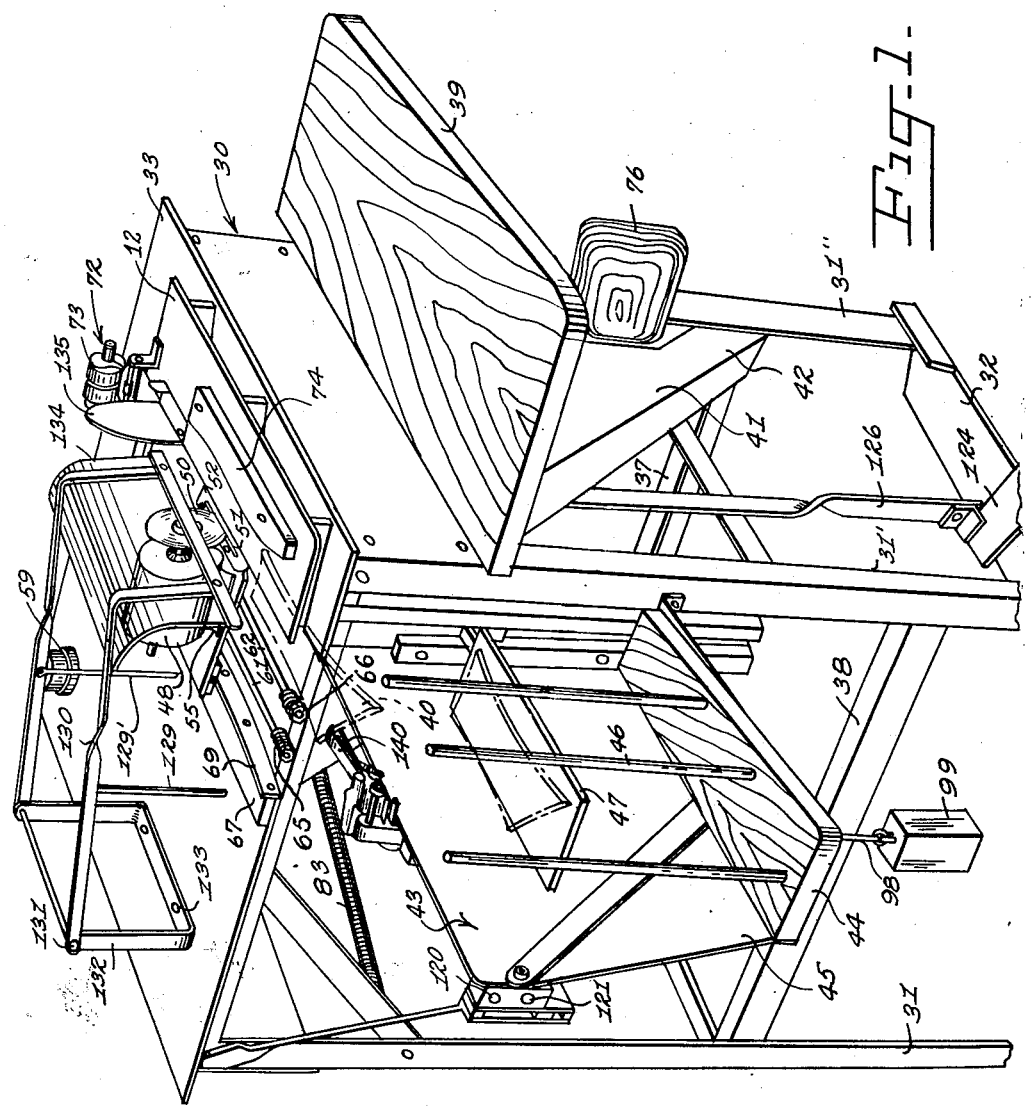
Figure 1 is a perspective view of the cutting machine, according to the present invention.
Figure 2:
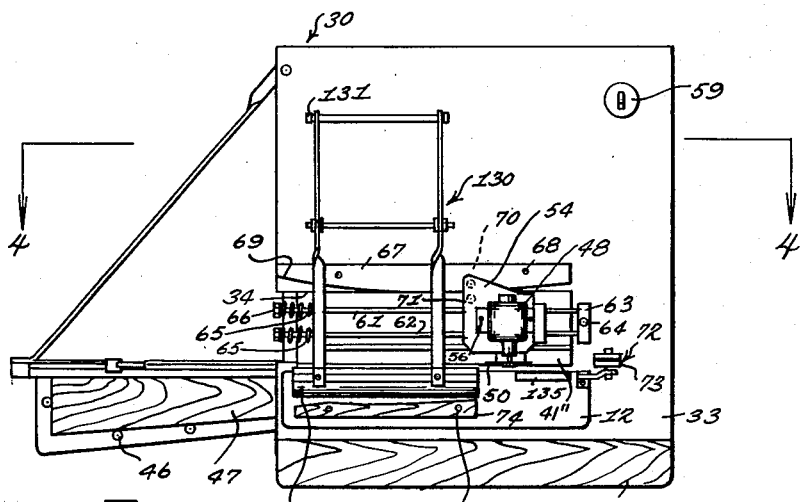
Figure 2 is a top plan view of the machine.
Figure 3:
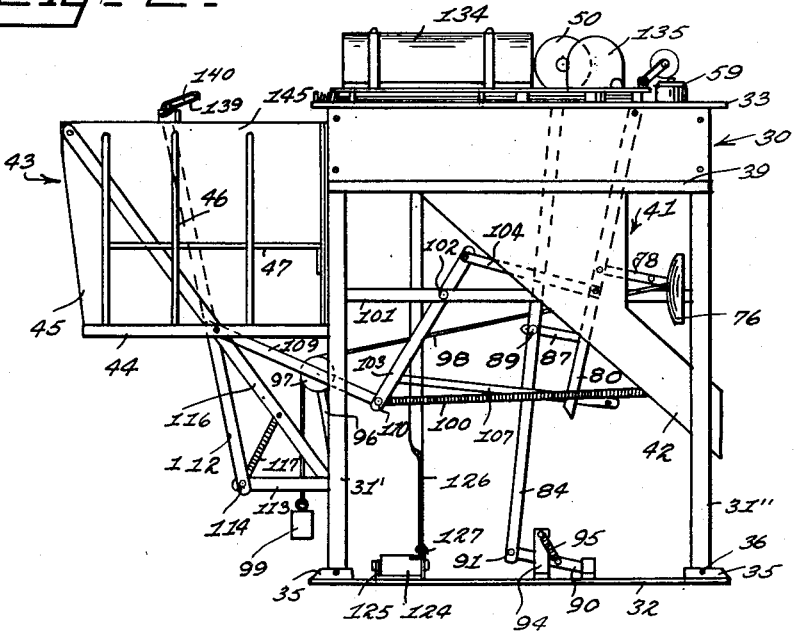
Figure 3 is a front elevational view of the machine.

Referring in detail to the drawings, the numeral 30 designates a table or bench which may be fabricated of any suitable material. The table 30 includes a plurality of vertically disposed spaced parallel legs 31, there being a horizontally disposed floor plate 32 secured to the lower ends of the pair of front legs 31' and 31''. A horizontally disposed platform 33 is supported on top of the vertically disposed legs and is secured thereto, there being a rectangular cutout 34 arranged in the platform 33, and the cutout 34 extends from the left side thereof.

The lower ends of the vertically disposed legs 31 each have a shoe 35 secured thereto by a suitable securing element, such as a rivet 36, and the shoes 35 add stability to the machine. Suitable horizontally disposed braces 37 and 38 extend between the front and rear legs of the machine for maintaining the legs in spaced parallel relation.

Projecting from the front of the machine is a horizontally disposed shelf 39 and the shelf 39 is adapted to support articles, such as collars 40, prior to their being cut or trimmed by the machine. Arranged adjacent the front of the cutting machine and supported by the latter is a chute 41 which serves to convey the trimmed or scrap portions of the articles, such as the collars 40, away from the machine for deposit in a suitable receptacle. The upper end of the chute 41 is open, the top edge portion 41'', of the back wall 41', is rearwardly and upwardly inclined to project beyond the inner side edge of a base plate 12, supported on top of the front side of the platform 33, thus providing a throat into which the trimmed portions of the material drop as the latter is cut. An inclined spout 42 depends from the lower end of the chute 41 and has its lower end open for the discharge therethrough of the trimmed portions of the collars.

Arranged on the left side of the machine, adjacent the front end thereof, is a receptacle 43 for receiving the articles after they have been trimmed or cut by the machine. A mechanism is provided for automatically picking up the articles, such as collars 40 and depositing them in the receptacle 43 after they have been trimmed to thereby free the operator's hands so that the operator can be placing another article, such as a collar, in position to be cut. This pick-up mechanism is described in detail later in this application. The receptacle or bin 43 is supported by the table 30 and the receptacle 43 includes a horizontally disposed bottom plate 44, there being a vertically disposed back plate 45 secured to the rear edge of the bottom plate 44. A plurality of vertically disposed spaced parallel rods 46 project upwardly from the bottom plate 44 and the rods 46 coact with the back plate 45 to hold trimmed articles therebetween. A horizontally disposed support member 47 is mounted for vertical adjustable movement in the receptacle 43 and the support member 47 can be used to facilitate the removal of the cut or trimmed articles from the receptacle 43.

Mounted for movement along the table 30 is a motor 48 which is adapted to be connected to a source of electrical energy and the motor 48 rotates a drive shaft 49. Mounted on the drive shaft 49 is a rotary cutting knife or blade 50 which serves to trim or cut the collars or other articles as the motor driven knife moves along the table. The lower end of the knife 50 projects through a slot 51 in a guide member 52, and the guide member 52 insures that the articles are cut evenly. Suitable securing elements such as screws 53 secure the guide member 52 to a horizontally disposed base plate 54. A bracket 55 has secured thereto the motor 48 for supporting the latter, and the bracket 55 is mounted for vertical adjustment on a plurality of headed bolts 56, the bolts 56 projecting through the base plate 54. A wing nut 57 is arranged in threaded engagement with each of the bolts 56, and circumposed on the bolts 56 and interposed between the bracket 55 and the base plate 54 is a coil spring 58.

To position the motor 48 at any desired elevation and consequently arrange the knife 50 for a desired depth of cutting, the operator rotates the wing nuts 57 on the bolts 56 in the proper direction to thereby vary the tension on the springs 58 and consequently position the knife 50 at the desired elevation. An on and off switch 59 is supported on the platform 33 so that the motor 48 can be electrically energized as desired.

Secured to the bottom of the base plate 54 as by welding, is a pair of spaced parallel bearing blocks 60 and 60', Figure 10, and the bearing blocks 60 and 60' slidably receive a pair of spaced parallel rods 61 and 62 which serve as tracks or rails for the motor driven cutting knife as the latter moves back and forth across the table. The right ends of the rods 61 and 62 are securely positioned in an end member 63, and a bolt and nut assembly 64 pivotally connects the end member 63 to the platform 33 of the table so that the pair of rods 61 and 62 are free to rotate about a vertical axis.

Arranged on the other or left end of each of the rods 61 and 62 is a small shock absorber which serves to cushion or lessen the impact of the motor driven cutting knife during its movement from the right side of the table to the left side thereof. Each of the shock absorbers comprises a coil spring 65 which is circumposed on the rods 61 and 62, and a suitable nut 66 is arranged in threaded engagement with the adjacent end of the rods 61 and 62 to maintain the parts in assembled relation.

Arranged to the rear of the cutout 34 in the platform 33 is a body member 67, there being suitable securing elements, such as screws 68, for releasably securing the member 67 to the platform 33. A template 69 is secured to the member 67, and the template 69 may have any desired shape or configuration depending on the contour at which the collars or other articles are to be trimmed. For causing the cutting knife 50 to follow the predetermined path of the template 69, a pair of rollers 70 and 71 are carried by the base plate 54, and the rollers 70 and 71 are arranged on opposite sides of the template 69. For selectively sharpening the knife 50, a sharpener 72 is supported on the platform 33, the sharpener 72 including a pair of suitable sharpening stones 73.

A guide member 74 is secured to the front of the platform 33 by rivets or screws 75 to facilitate the proper placement of the articles being cut in the machine, it being supported on a horizontal base plate 12, mounted on top of the front side of the platform 33.

For causing movement of the motor driven cutting knife 50 from one side of the table to the other, a lever 76 is adapted to be actuated or moved by the operator's knee. The lever 76 may have a felt or cloth pad thereon to enable the operator to actuate the machine in comfort. The lever 76 is arranged at the front of the machine and is secured to a link 77 which is pivotally connected to the rear portion of the table 30. A member 78 has one of its ends pivotally connected to the link 77, while a pin 79 pivotally connects the other end of the member 78 to an arm 80, the arm 80 having its upper end pivotally connected to a bracket 81 by means of a pin 82. The bracket 81 is secured to the undersurface of the platform 33, Figure 4. A spring 83 has one of its ends connected to the link 77, as at 83' (Figure 1), and the other end of the spring 83 is connected to one of the rear legs 31 of the table 30. An elongated arm 84 has its upper end pivotally connected to a bracket 85 by means of a bolt and nut assembly 86, the bracket 85 being secured to the base plate 54, so that movement of the arm 84 causes movement of the cutter knife 50. The member 87 has one of its ends connected to the arm 80 by means of a pin 88, and the other end of the member 87 is pivotally connected to the arm 84 by means of a pin 89.

A support member 90 has its upper end pivotally connected to the lower end of the arm 84 by means of a pin 91, and the lower end of the support member 90 is pivotally connected to a vertically disposed upright 93 by means of a pin 92. Arranged adjacent the upright 93 is a second upright 94 which also projects upwardly from the bottom plate 32 of the table 30, and a coil spring 95 has one of its ends connected to the upper end of the upright 94 and the lower end of the coil spring 95 is connected to the support member 90. From the foregoing, it is seen that movement of the knee lever 76 to the right causes pivotal movement of the arm 80 and since the arm 80 is connected by a member 87 to the arm 84, the motor driven cutting knife 50 will also be moved to the right of the table at the same time that the knee lever 76 moves to the right.

Projecting upwardly from the brace 38 and secured thereto, is a brace 96 which rotatably supports a pulley 97 on its upper end. A cord or cable 98 is trained over the pulley 97 and a counterweight 99 is connected to the lower end of the cable 98. The other end of the cable or line 98 is connected to the link 77. The counterweight 99 coacts with the spring 83, spring 95, and with a spring 100 to return or draw the motor driven cutting knife 50 from right to left after the pressure on the knee lever 76 has been released.

A pick-up mechanism is provided for picking up the collars 40, or other articles, after the articles have been cut for depositing the cut articles into the receptacle 43. This pick-up mechanism is adapted to be actuated by the same mechanism that moves the cutter 50 from side to side on the machine, and further or additional operation of the pick-up mechanism is accomplished by means of a foot pedal as hereinafter described. A horizontally disposed brace 101 is secured to the legs of the table 30 and a pin 102 pivotally connects a lever 103 to the brace 101. A member 104 has one of its ends pivotally connected to the upper end of the lever by a pin 105, and the other end of the member 104 is pivotally connected to the arm 80 by means of a pin 106, Figure 4. Arranged below the member 104 is a guide bracket 107 which has one of its ends connected to the lower end of the lever 103 by a pin 108, and the member 107 serves to maintain the arms 80 and 84 in alignment.

A link 109 has one of its ends pivotally connected to the lower end of the lever 103 by means of a pin 110, while the other end of the link 109 is pivotally connected to an arm 112 by means of a pin 111. The lower end of the arm 112 is pivotally connected to a brace 113 by means of a pin 114. A fixed brace 116 is secured to the machine, and a coil spring 117 extends between the brace 116 and the pin 114.

Arranged to the rear of the back plate 45 of the receptacle 43 is a pair of spaced end blocks 118 and 119 which support therebetween a pair of horizontally disposed spaced parallel rods 120 and 121, and the rods 120 and 121 serve as rails or tracks for slidably supporting a portion of the pick-up mechanism. Arranged below the lowermost rod 121 and extending from one end of the machine to the other is a bar 122 which has one of its ends pivotally connected to a leg 31 by means of a pin 123.

The bar 122 is adapted to be raised by actuation of the foot pedal 124 which is pivotally supported by a pair of brackets 125 that are secured to the base plate 32. A vertically disposed arm 126 has its lower end pivotally connected to the foot pedal 124 by means of a pin 127 while connected to the upper end of the arm 126 is a cross piece 128. Connected to the ends of the cross piece 128 is a pair of vertically disposed spaced parallel eye bolts 129 and 129', and the upper ends of the eye bolts 129 and 129' are connected to a frame 130. The frame 130 has its rear end pivotally supported by means of a pin 131 which projects through a bracket 132 and the bracket 132 is secured by suitable securing elements 133 to the platform 33.

Carried by the front of the frame 130 is an arcuate guard or shield 134 which is preferably fabricated of a transparent plastic such as Plexiglas. Thus, upon a properly directed pressure on the foot pedal 124, the shield 134 can be raised or lowered in order to allow positioning of the next article to be cut in the machine. The shield 134 of course serves to protect the operator of the machine from being injured by the high speed rotary cutting knife 50. Additional protection is afforded the operator by means of a guard plate 135 which has its lower end secured to the platform 33.

In Figures 6, 7 and 8, there is shown in detail the construction of the pick-up fingers for grasping the articles, such as collars 40, after the collars have been cut for removal to the bin 43. Thus, there is provided a backing plate 136 which slidably receives the rods 120 and 121 therein, and secured to the plate 136 is a body member 137. Connected to the top of the body member 137 by a bolt and nut assembly 138 is a lower jaw 139. An upper jaw or finger 140 is mounted for movement towards and away from the lower jaw 139 to grasp and hold the cut article therebetween. A bracket 141 has its lower end pivotally connected to the lower jaw or finger 139 by a pin 142 and the upper portion of the bracket 141 is secured to the upper finger or jaw 140 by means of a screw 143. A coil spring 144 has its opposite ends connected to the bracket 141 and to the bolt and nut assembly 138 for normally urging the finger 140 into its open position away from the lower finger or jaw 139 as shown in Figure 8.

For moving the jaw 140 towards the jaw 139, an L-shaped member 145 is slidably or adjustably connected to the member 137 by means of brackets 146. Secured to the member 145 is a cam 147 which is arranged in engagement with, or in contact with, the upper surface of the bar 122. The upper end of the member 145 is shaped to define a transverse or hook portion 148 that is arranged just below and in engagement with a rectangular lug 149 that is secured to the upper surface of the finger 140 as by welding. Projecting forwardly from the cross piece 128 is a bar or rod 150 which is arranged in frictional engagement with the lower end of the bar 122 so that when the arm 126 moves upwardly the cross piece 128 is also raised to thereby raise the rod 150 which lifts or pivots the bar 122. This upward movement of the bar 122 raises the L-shaped member 145 upwardly since the cam 147 is arranged in engagement with the bar 122 and as the member 145 moves up, it causes the finger or jaw 40 to move towards the lower jaw 139. A coil spring 151 extends between the pin 142 and a pin 152 which projects into the member 137 so that the position of the lower jaw 139 can be adjusted as desired.

Referring to Figure 11, there is shown a slightly modified pick-up mechanism which includes an arcuate bar 153 that serves the same purpose as the previously described bar 122. Thus, upward movement of the bar 153 causes the upper finger 140 to move towards the lower finger 139 so that an article is gripped therebetween. The arcuate shape of the bar 153 insures that the pick-up fingers will follow a correct path in order to properly grasp and release the cut articles.

The operation of the machine is as follows:
First, the switch 59 is actuated to energize the motor 48. Then, with the operator sitting in front of the machine facing shelf 39, Figure 1, and with the cutting knife 50 being driven or rotated at a very high speed by the motor 48, the operator exerts a pressure on the lever 76, thus moving the lever 76 towards the right end of the machine. This movement of the lever 76 results in a counter-clockwise pivotal movement of the arm 80 about the pin 82 and this movement of the arm 80 in turn results in or causes the arm 84 to pivot in a clockwise direction about the pin 91 to thereby move the motor driven cutter 50 towards the right side of the machine, At the same time that the motor driven cutting knife 50 moves to the right side of the machine, the pick-up mechanism will move to the extreme left end of the machine adjacent the outer end of the receptacle 43. This movement of the pick-up mechanism is accomplished since the lever 103 is caused to pivot in a clockwise direction about the pin 102 and this movement of the lever 103 results in a counter-clockwise pivotal movement of the arm 112 about the pin 114. Now, with the cutter cutting knife 50 at the right side of the machine, pressure is exerted by the operator's foot on the pedal 124 to thereby raise the arm 126 which lifts the cross piece 128 and this upward movement of the cross piece 128 results in the bar 122 also being raised. Thus, since the cross piece 128 is raised, the eye bolts 129 and 129' are moved upwardly to thereby pivot the transparent shield 134 into the position shown in Figure 1 so that the operator can readily place the collar 40 or other article to be trimmed, in position. Then, upon release of the pressure on the pedal 124 the shield 134 will move down into clamping relation with respect to the collar 40 so that the collar will remain immobile during the cutting thereof. Next, the pressure on the knee lever 76 is released so that the springs 83, 100, 95 and the counterweight 99 draw the cutting knife from the right side of the machine (Figure 1) to the left side thereof whereby the collars or other articles are trimmed evenly and precisely. As the motor driven cutting knife is guided on the rails or rods 61 and 62 by means of the template 69, the collars can be cut to any desired contour by simply using a template 69 of the desired configuration.

After the collars 40 have been cut or trimmed by the knife 50, it will be seen that the knife 50 is now at the extreme left position on the platform 33 (Figure 1) and at the same time the pick-up mechanism has moved from the left end of the receptacle 43 to a position contiguous to the end of the collar 40. Now, a downwardly directed pressure is exerted on the foot pedal 124 whereby the upper finger 140 is moved toward the lower finger 139 to grasp therebetween the cut collar 40. Next, the cycle is repeated and the knee lever 76 is moved to the right resulting in the motor driven cutting knife 50 moving the right side of the machine as previously described and also resulting in the pick-up mechanism carrying the cut or trimmed article to a position above the receptacle 43. Now, upon actuation of the pick-up mechanism, the finger 140 is moved away from the lower finger 139, thereby releasing the cut collar so that it falls into the receptacle 43. The trimmed portions or scraps that have been cut by the cutting knife fall into the chute 41 and can be discharged into any suitable receptacle as desired.

From the foregoing, it is apparent that a machine has been provided which is especially useful in trimming or cutting wearing apparel, textiles, or leather, and such articles can be cut in any shape desired. The depth of the cut can be regulated and the cutting knife 50 can be easily sharpened on the sharpening device 72. The operation is easy and a person can operate the machine in absolute safety. It is to be understood that other arrangements of the linkage and leverage for actuating the pick-up mechanism and for moving the knife can be provided as desired. By using the machine of the present invention, a plurality of articles, such as collars, can be quickly trimmed thereby making it possible to assemble articles of wearing apparel quickly and economically. The machine is especially suitable for trimming the proper edge on collars and cuffs. Thus, in fabricating collars, three pieces of material are stitched together and these pieces usually get out of alignment so that before the collars can be sewed to a garment, these pieces must be evened up or trimmed properly. Also, the collars require a slight contour and by using this machine, a great number of the collars can be so cut or trimmed.

What I claim:

1. A cutting machine comprising a table, tracks connected to said table and mounted for pivotal movement about a vertical axis, a template supported by said table, and a movable cutting member operatively connected to said template and mounted to travel along said tracks to cut articles to a desired shape.

2. In a machine of the class described, a table, tracks supported on said table and mounted for pivotal movement about a vertical axis, a template connected to said table, a work performing member mounted for travel along said tracks and operatively connected to said template whereby said member is caused to follow a predetermined path.

3. The invention as defined in claim 1, with said table having an elongated opening and having said tracks extending lengthwise thereof, and said template mounted on said table at one side of the opening, said opening allowing waste portions trimmed from the cut articles to drop therethrough.

4. The invention as defined in claim 1, with said table having an elongated opening and having said tracks extending lengthwise thereof, a base plate slidably supported on said tracks and having a slotted opening therein, said cutting member being circular and having a portion depending through said slotted opening, and an electric motor supported on said base plate and having said cutting member mounted on the rotor shaft thereof.

5. The invention as defined in claim 1, with said table having an elongated opening and said tracks extending lengthwise of and slightly above the same, and a chute supported beneath said table and having a throat underlying the path of travel of said cutting member to receive waste portions trimmed off from the cut articles.

6. The invention as defined in claim 1, with a power means for actuating said cutting member, manually operated means for moving said power means and the cutting member along said tracks in one direction, and automatic means for moving said power means and the cutting member along said tracks in the opposite direction upon the release of said manually operated means.

7. The invention as defined in claim 1, with manually operated means for moving said cutting member along said tracks in one direction and other means for automatically moving said cutting member along said tracks in the opposite direction upon the release of said manually operated means, said manually operated means being comprised in a system of levers of which one is adapted to be actuated by a knee of the operator of the machine.

8. The invention as defined in claim 1, with a receiver for the cut articles mounted at one end of said table, and a pickup mechanism for removing the cut articles from the place of cutting and depositing the same within said receiver.

9. The invention as defined in claim 1, with a receiver for the cut articles mounted at one end of said table and a pickup mechanism for removing the cut articles from the place of cutting to a position above said receiver, and manually operated means for releasing the cut articles from said pickup mechanism for the deposit of the same into the receiver.

10. The invention as defined in claim 1, with a clamping means mounted for vertical movements above and relatively to said table and manually operated means for lifting said clamping means for the positioning of the material to be cut beneath the same, said clamping means moving downward to clamp the material in place on the table during the cutting operation and upon the release of said manually operated means.

11. The invention as defined in claim 1, with said table having an elongated opening spaced inwardly from and parallel to its front edge and said tracks extending lengthwise of and above the opening, a clamp bar supported for vertical movements above and relatively to said table at the front side of said opening, manually operated means for lifting said bar for the placing of the material to be cut beneath the same, said bar dropping onto the material to clamp the same in place during the cutting operation upon the release of said manually operated means, and a transparent shield carried by said bar to protect the operator of the machine from injury by said cutting member.

FRANK C. LANGE.

REFERENCES CITED

The following references are of record in the file of this patent:

UNITED STATES PATENTS

| Number | Name | Date |
| --- | --- | --- |
| 729,964 | Scherer | June 2, 1903 |
| 1,154,924 | Holub | Sept. 28, 1915 |
| 1,472,895 | Wegner | Nov. 6, 1923 |
| 1,812,406 | Jenkins | June 30, 1931 |
| 1,986,791 | Butts | Jan. 8, 1935 |